United States Patent
Saon

(10) Patent No.: US 9,858,919 B2
(45) Date of Patent: Jan. 2, 2018

(54) SPEAKER ADAPTATION OF NEURAL NETWORK ACOUSTIC MODELS USING I-VECTORS

(71) Applicant: International Business Machines Corporation, Armonk, NY (US)

(72) Inventor: George A. Saon, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 14/500,042

(22) Filed: Sep. 29, 2014

(65) Prior Publication Data

US 2015/0149165 A1      May 28, 2015

Related U.S. Application Data

(60) Provisional application No. 61/909,790, filed on Nov. 27, 2013.

(51) Int. Cl.
  *G10L 15/16* (2006.01)
  *G10L 17/18* (2013.01)
  *G10L 15/06* (2013.01)

(52) U.S. Cl.
  CPC .......... *G10L 15/063* (2013.01); *G10L 15/16* (2013.01); *G10L 17/18* (2013.01)

(58) Field of Classification Search
  CPC ........ G10L 15/063; G10L 15/16; G10L 15/18
  USPC ......................................................... 704/232
  See application file for complete search history.

(56) References Cited

U.S. PATENT DOCUMENTS

| | | | |
|---|---|---|---|
| 5,600,753 A | 2/1997 | Iso | |
| 5,729,694 A | 3/1998 | Holzrichter et al. | |
| 6,845,357 B2 | 1/2005 | Shetty et al. | |
| 2008/0312926 A1* | 12/2008 | Vair | G10L 17/16 704/249 |
| 2010/0169090 A1* | 7/2010 | Cui | G10L 15/20 704/233 |
| 2013/0006623 A1* | 1/2013 | Chelba | G10L 15/187 704/233 |

OTHER PUBLICATIONS

Andrew Senior, et al., Improving DNN Speaker Independence With I-Vector Inputs, 2014 IEEE Int. Conf. on Acoustics, Speech and Signal Processing (ICASSP), May 4-9, 2014, pp. 225-229.

(Continued)

*Primary Examiner* — Paras D Shah
*Assistant Examiner* — Rodrigo Chavez
(74) *Attorney, Agent, or Firm* — Kevin M. Jordan; Otterstedt, Ellenbogen & Kammer, LLP

(57) ABSTRACT

A method includes providing a deep neural network acoustic model, receiving audio data including one or more utterances of a speaker, extracting a plurality of speech recognition features from the one or more utterances of the speaker, creating a speaker identity vector for the speaker based on the extracted speech recognition features, and adapting the deep neural network acoustic model for automatic speech recognition using the extracted speech recognition features and the speaker identity vector.

10 Claims, 3 Drawing Sheets

(56) References Cited

OTHER PUBLICATIONS

Ossama Abdel-Hamiid, et al., Fast Speaker Adaptation of Hybrid NN/HMM Model for Speech Recognition Based on Discriminative Learning of Speaker Code, 2013 IEEE Int. Conf. on Acoustics, Speech and Signal Processing (ICASSP), May 26-31, 2013, pp. 7942-7946.

Najim Dehak, et al., Front-End Factor Analysis for Speaker Verification, IEEE Transactions on Audio, Speech, and Language Processing, vol. 19, No. 4, May 2011, pp. 788-798.

Najim Dehak, et al., Language Recognition via Ivectors and Dimensionality Reduction, Interspeech 2011, , Aug. 28-31, 2011, pp. 857-860, Florence, Italy.

Marc Ferras, et al., MLP-Based Factor Analysis for Tandem Speech Recognition, 2013 IEEE Int. Conf. on Acoustics, Speech and Signal Processing (ICASSP), May 26-31, 2013, pp. 6719-6723.

Martin Karafiat et al., iVector-Based Discriminative Adaptation for Automatic Speech Recognition, 2011 IEEE Workshop on Automatic Speech Recognition and Understanding, Dec. 11-15, 2011, pp. 152-157.

\* cited by examiner

SPEAKER ADAPTATION OF NEURAL NETWORK ACOUSTIC MODELS USING I-VECTORS

CROSS-REFERENCE TO RELATED APPLICATIONS

This application claims the benefit of U.S. Provisional Patent Application No. 61/909,790 filed on Nov. 27, 2013, the complete disclosure of which is expressly incorporated herein by reference in its entirety for all purposes.

BACKGROUND

The present disclosure relates to acoustic modeling, and more particularly to speaker adaptation of deep neural networks (DNNs).

Given the popularity of DNNs for acoustic modeling, speaker adaptation of DNNs is an active area of research. However, the portability of transform-based approaches like Maximum-Likelihood Linear Regression (MLLR) that work well for Gaussian mixture models to DNNs is not straightforward. Unlike Gaussian means or variances that can be transformed together if they belong to the same acoustic class (phones, Hidden Markov model (HMM) states or clustered versions thereof), it can be difficult to find structure in the weights of a neural network.

BRIEF SUMMARY

According to an exemplary embodiment of the present disclosure, a method includes providing a deep neural network acoustic model, receiving audio data including one or more utterances of a speaker, extracting a plurality of speech recognition features from the one or more utterances of the speaker, creating a speaker identity vector for the speaker based on the extracted speech recognition features, and adapting the deep neural network acoustic model for automatic speech recognition using the extracted speech recognition features and the speaker identity vector.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
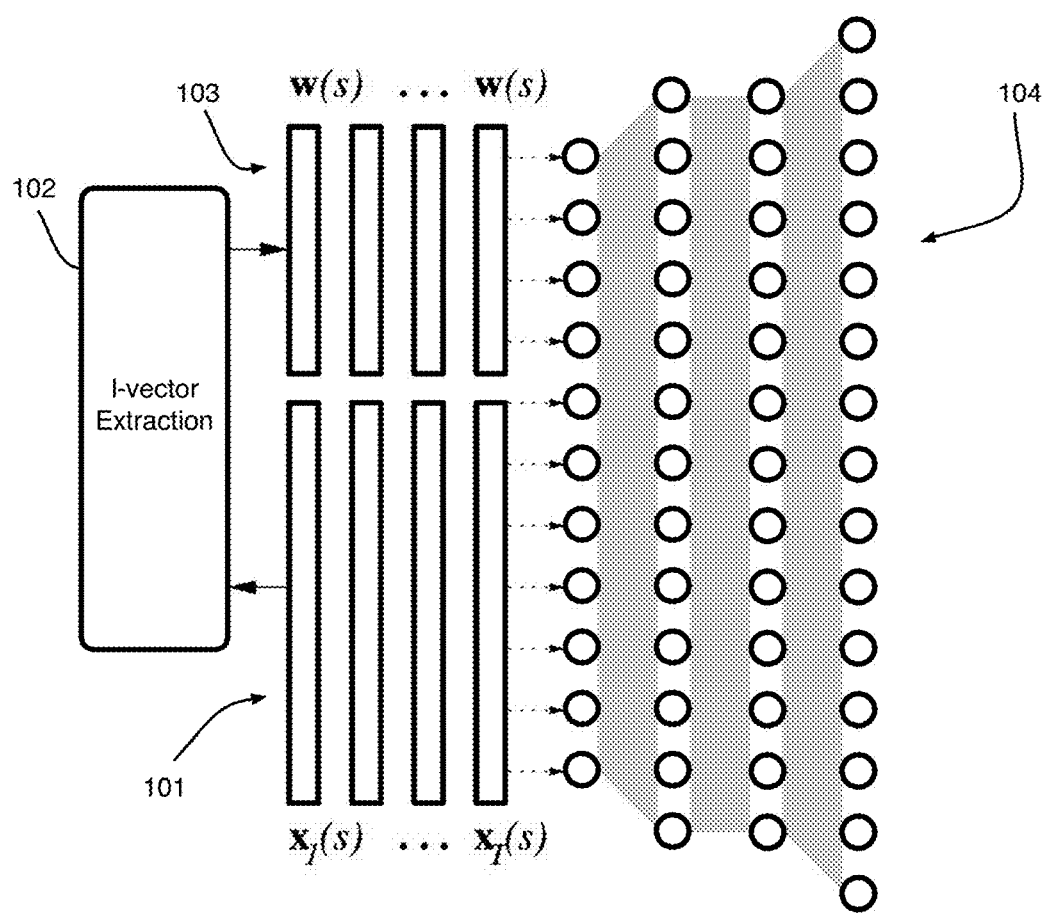
FIG. 1 is a diagram of a i-vector extraction and input features for a neural network according to an exemplary embodiment of the present disclosure.

Deep neural networks (DNNs) have powerful applications in acoustic modeling due in part to the ability to learn in multiple levels corresponding to different levels of abstraction. Described herein are exemplary approaches for adapting DNN acoustic models to a target speaker by supplying speaker identity vectors (i-vectors) as input features to the network in parallel with acoustic features for automatic speech recognition (ASR). Furthermore, in one or more exemplary embodiments, the i-vector for a given speaker is concatenated to every frame belonging to that speaker and changes across different speakers for both training and test scenarios.

Speaker recognition features can be used in a variety of applications. For example, a DNN can learn speaker-dependent transforms for the acoustic features to create a canonical phone classification space (i.e., pronunciations according to formal rules) in which inter-speaker variability is significantly reduced. More generally, consider two types of speakers, A and B, which differ in the way they pronounce the phone /AA/. Speaker type A uses the canonical pronunciation /AA/ whereas speaker type B systematically pronounces it as /AE/ (e.g., with casual or accented speech). A DNN without speaker features will tend to classify B's /AA/ as /AE/ because statistically there will be more /AE/'s with canonical pronunciations in the training data. A DNN with speaker identity features however, will learn to significantly increase the output score for /AA/ when presented with /AE/ acoustics for speakers of type B (but not for speakers of type A).

According to an exemplary embodiment of the present disclosure, i-vectors are used for speech verification and speech recognition. The i-vectors encapsulate all the relevant information about a speaker's identity in a low-dimensional fixed-length representation. This makes i-vectors an attractive tool for speaker adaptation techniques for ASR. For example, a concatenation of i-vectors and ASR features can be used for discriminative speaker adaptation with region dependent linear transforms. I-vectors can also be used for clustering speakers or utterances on mobile devices for more efficient adaptation.

Experimental results on a Switchboard 300 hours corpus show that DNNs trained on speaker independent features and i-vectors achieve about a 10% relative improvement in word error rate (WER) over networks trained on speaker independent features only. These networks are comparable in performance to DNNs trained on speaker-adapted features (with Vocal Tract Length Normalization (VTLN) and feature-space MLLR (fMLLR)) with the advantage that only one decoding pass is needed. Furthermore, networks trained on speaker-adapted features and i-vectors achieve about a 5-6% relative improvement in WER after hessian-free sequence training over networks trained on speaker-adapted features only.

According to an exemplary ASR method, the DNN is provided with untransformed features and the DNN determines the speaker normalization during training More particularly, the DNN is informed of which features belong to which speaker. This can be accomplished by creating two sets of time-synchronous inputs or sets of features. A first set of acoustic features is created for phonetic discrimination and a second set of features is created that characterize the speaker that provided the audio for the first set of features. According to an exemplary embodiment, the features that characterize a speaker are the same for all the data of that speaker.

Referring now to i-vector methods, according to one exemplary embodiment, acoustic feature vectors $x_t \in \mathbb{R}^D$ are seen as samples generated from a universal background model (or UBM) represented as a Gaussian Mixture Model (GMM) with K diagonal covariance Gaussians $$x_t \sim \sum_{k=1}^{K} c_k N(\cdot; \mu_k(0), \Sigma_k) \qquad (1)$$

with mixture coefficients $c_k$, means $\mu_k(0)$ and diagonal co-variances $\Sigma_k$. Moreover, data $x_t(s)$ belonging to speaker s are drawn from the distribution $$x_t(s) \sim \sum_{k=1}^{K} c_k N(\cdot; \mu_k(s), \sum_k) \quad (2)$$

where $\mu_k(s)$ are the means of the GMM adapted to speaker s. According to one exemplary embodiment, the i-vector method assumes a linear dependence between the speaker-adapted means $\mu_k(s)$ and the speaker-independent means $\mu_k(0)$ of the form $$\mu_k(s) = \mu_k(0) + T_k w(s), k=1 \ldots K \quad (3)$$

$T_k$, of size D×M, is called the factor loading submatrix corresponding to component k and w(s) is the speaker identity vector ("i-vector") corresponding to s. Each $T_k$ contains M bases, which span the subspace with important variability in the component mean vector space. Given the foregoing, an estimate of w(s) can be determined given $T_k$ and speaker data $\{x_t(s)\}$. Further, the matrices can be estimated given training data $\{x_t\}$.

I-Vector Estimation:

From a Bayesian perspective, w is treated as a latent variable with a 0-mean, identity covariance Gaussian prior distribution and the posterior distribution of w is estimated given speaker data $\{x_t(s)\}$, i.e., $p(w|\{x_t(s)\})$. It can be shown that this posterior distribution is Gaussian $$p(w|\{x_t(s)\}) = N\left(w; L^{-1}(s) \sum_{k=1}^{K} T_k^T \sum_k^{-1} \theta_k(s), L^{-1}(s)\right) \quad (4)$$

with precision matrix L(s) of size M×M expressed as $$L(s) = I + \sum_{k=1}^{K} \gamma_k(s) T_k^T \sum_k^{-1} T_k \quad (5)$$

The quantities that appear in Eqs. (4) and (5) are the zero-order and centered first-order statistics and are defined as $$\gamma_k(s) = \sum_t \gamma_{tk}(s), \quad (6)$$

$$\theta_k(s) = \sum_t \gamma_{tk}(s)(x_t(s) - \mu_k(0)) \quad (7)$$

with $\gamma_{tk}(s)$ being the posterior probability of mixture component k given $x_t(s)$. Here, mixture component k is a Gaussian index and t is a frame index (e.g., time). According to one exemplary embodiment, the i-vector is approximated by the MAP point-estimate of the variable w that is the mean of the posterior distribution from Eq. (4), i.e., $$w(s) = L^{-1}(s) \sum_{k=1}^{K} T_k^T \sum_k^{-1} \theta_k(s) \quad (8)$$

Factor Loading Matrix Estimation:

According to one exemplary embodiment, model hyper-parameters $\{T_1, \ldots, T_K\}$ are estimated by maximizing the objective function $$Q(T_1, \ldots, T_K) = -\frac{1}{2} \sum_{s,t,k} \gamma_{tk}(s) \big[\log|L(s)| + \quad (9)$$

$$(x_t(s) - \mu_k(s))^T \sum_k^{-1} (x_t(s) - \mu_k(s))^T \sum_k^{-1} (x_t(s) - \mu_k(s))\big]$$

which can be written equivalently as $$Q(T_1, \ldots, T_K) = \quad (10)$$

$$-\frac{1}{2} \sum_{s,t} \left[\gamma_k(s)\log|L(s)| + \gamma_k(s)Tr\left\{\sum_k^{-1} T_k w(s)w(s)^T T_k^T\right\} - \right.$$

$$\left. 2Tr\left\{\sum_k^{-1} T_k w(s)\theta_k(s)^T\right\}\right] + C$$

The term log |L(s)| comes from the logarithm of the posterior $p(w|\{x_t(s)\})$ evaluated in w(s). Taking the derivative of Eq. (10) with respect to $T_k$ and setting it to 0 leads to collecting the statistics $$C_k = \sum_s \theta_k(s) w^T(s), \quad (11)$$

$$A_k = \sum_s \gamma_k(s)(L^{-1}(s) + w(s)w^T(s)) \quad (12)$$

where $L^{-1}(s)$ and w(s) are given respectively by Eqs. (5) and (8) for speakers. According to one exemplary embodiment, the factor loading submatrices are updated as $$T_k = C_k A_k^{-1}, k=1 \ldots K \quad (13)$$

Figure 2:
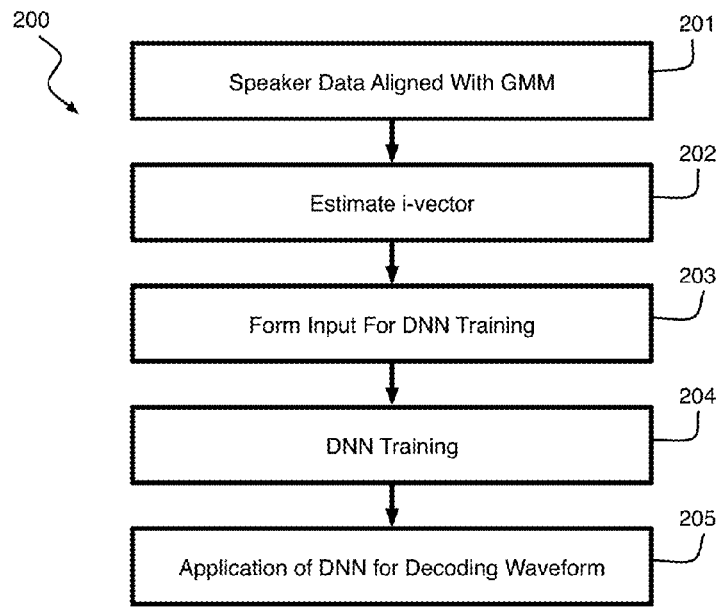
FIG. 2 is a flow diagram according to FIG. 1.

Integration with DNN:

As shown in FIGS. 1 and 2, one exemplary method for using i-vectors with a neural network is as follows. At block 201 of the exemplary method 200, the speaker data $\{x_t(s)\}$ is aligned with the GMM (the speaker-independent GMM) to estimate the zero-order and first-order statistics from Eqs. (6) and (7) (see also 101). In one example, the alignment includes finding, for every frame, the Gaussian with a highest score. In another example, the alignment includes calculating a maximum of the GMM posterior probability corresponding to a given frame.

At block 202, quantities are used to estimate the i-vector w(s) via Eqs. (5) and (8) (see also 102). Stated another way, the zero-order and first order statistics (Eq. (6) and (7)) are accumulated using the speaker-independent GMM, and those statistics are used to estimate the i-vectors (Eq. (8)).

At block 203, w(s) (the i-vector corresponding to s) is concatenated to every frame $x_t(s)$ to form the input for neural network training or decoding (see also 103). In FIG. 1, 104 represents the neural network being trained. The inclusion of w(s) in the input informs the DNN about the speech of a corresponding speaker, improving the decoding function of the DNN.

At block 204, the DNN is trained using the input including the i-vector and ASR features (see FIG. 1). At block 205, the trained DNN is applied to an input waveform to perform speech recognition.

It should be understood that DNN training can be performed according to an exemplary embodiment of the present invention using any vector or matrix characterizing the speaker (e.g., the mean and variance of features of the speaker) and thus is not limited to i-vectors.

Experiments:

Experiments conducted on a 300 hour subset of the Switchboard English conversational telephone speech task demonstrate the effectiveness of a DNN trained according to an exemplary embodiment of the present invention. The results that follow are reported on the test sets used during the Hub5 2000 and Rich Transcription 2003 DARPA evaluations, which are referred to herein as the Hub5'00 and RT'03 evaluation sets. These test sets contain 2.1 hours of audio, 21.4K words and 7.2 hours of audio, 76K words, respectively.

Frontend Processing:

According to one exemplary embodiment, an input waveform (e.g., a speech waveform) is coded into 25 millisecond (ms) frames, with a frame-shift of 10 ms. In this example, each frame is represented by a feature vector of 13 Perceptual Linear Prediction (PLP) cepstral coefficients, which are mean and variance normalized per conversation side. Every 9 consecutive cepstral frames are spliced together and projected down to 40 dimensions using LDA. The range of this transformation is further diagonalized by means of a global semi-tied covariance transform. Additionally, for the speaker-adapted features, the cepstra are warped with VTLN prior to splicing and projection. Then, one fMLLR transform per conversation side is determined on top of the LDA features at both training and test time.

I-Vector Extraction:

According to one exemplary embodiment, a maximum likelihood criteria is used to train two 2048 40-dimensional diagonal covariance GMMs: one for the speaker-independent and one for the speaker-adapted feature sets. These GMMs are used to predetermine the zero and first-order statistics via Eqs. (6) and (7) for all training and test speakers. The i-vector extraction matrices $T_1, \ldots, T_{2048}$ are initialized with values drawn randomly from the uniform distribution in $[-1, 1]$ and are estimated with 10 iterations of Expectation—Maximization (EM) by alternating the sufficient statistics collection Eqs. (11) and (12) and the factor subloading matrix update Eq. (13). Once the matrices are trained, M-dimensional i-vectors are extracted for all training and test speakers. This procedure is repeated for a number of different values (for example, 3 values of M: 40, 100 and 200). The i-vectors are scaled so that they have approximately unit variance on the training data for neural network training.

DNN Training:

According to one exemplary embodiment, a plurality of networks can be trained which differ in the type of input features: speaker-independent (SI) and speaker-adapted (SA) and in whether they have i-vector input or not. In the experiments, the trained networks share the following characteristics. The input features use a temporal context of 11 frames, meaning that the input layer has either 40×11+M (for M∈{40, 100, 200}) or 40×11 units for neural networks with and without i-vector inputs. The training data is divided randomly at the speaker level into a 295 hours training set and a 5 hours held-out set.

The trained networks have 6 hidden layers with sigmoid activation functions: the first 5 with 2048 units and the last one with 256 units for parameter reduction and faster training time. The output layer has 9300 softmax units that correspond to the context-dependent HMM states obtained by growing a phonetic decision tree with pentaphone cross-word context.

According to one exemplary embodiment, the training data is fully randomized at the frame level within a window of 25 hours and the nets are trained with stochastic gradient descent on minibatches of 250 frames and a cross-entropy criterion. Prior to the cross-entropy training of the full network, a layerwise discriminative pretraining is used by running one cross-entropy sweep over the training data for the intermediate networks obtained by adding one hidden layer at a time. Additionally, a Hessian-free sequence training is applied for some of the networks using a state-based minimum Bayes risk objective function. This objective function measures the expected number of HMM state errors where the expectation is taken over all the paths in a word lattice. The word lattices are obtained by decoding the training data with the cross-entropy trained networks.

Hybrid DNN-HMM Decoding:

According to one exemplary embodiment, the trained DNNs are used directly in a hybrid-decoding scenario by subtracting the logarithm of the HMM state priors from the log of the DNN output scores. The vocabulary used has 30.5K words and 32.8K pronunciation variants. The decoding language model is a 4-gram LM with 4 M n-grams.

Figure 3:
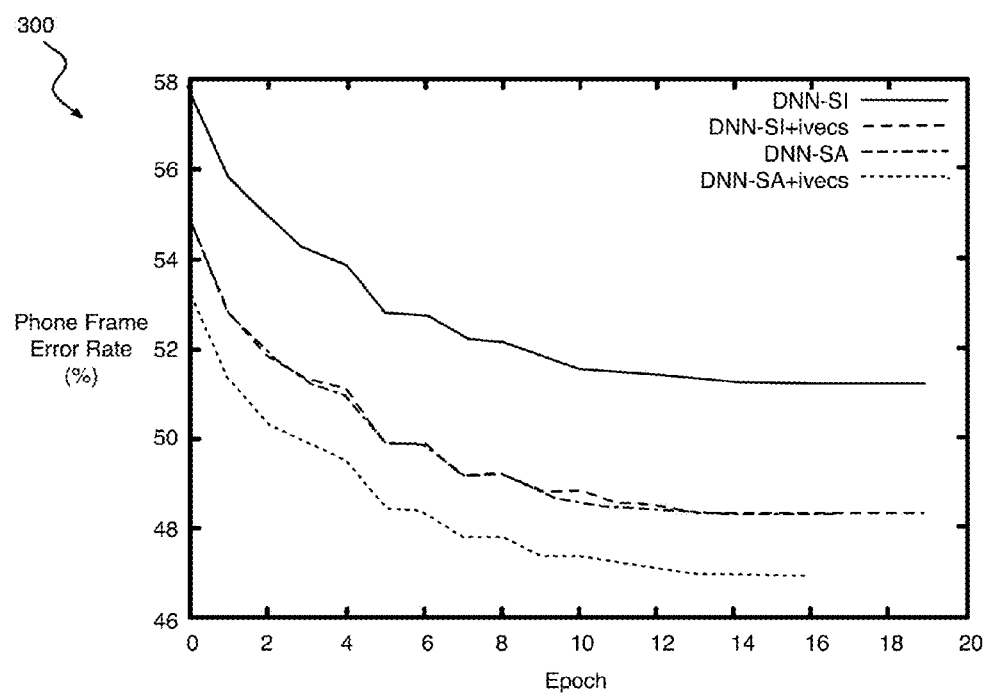
FIG. 3 is a graph of phone frame error rates on held-out data for various DNNs according to an exemplary embodiment of the present disclosure.

Experimental Results:

FIG. 3 is a graph 300 illustrating a comparison of the phone frame error rates obtained on the held-out set during the cross-entropy fine-tuning (i.e., after pretraining) of 4 networks: a DNN on SI features only, a DNN on SI features and i-vectors of dimension 100, a DNN on SA features only and a DNN on SA features and i-vectors of dimension 100. Note that the held-out set is data not used during training, it is only used to control the learning rate. It is observed that DNNs with i-vector inputs are substantially better than the ones trained on ASR features only. The curve for DNNs trained on SI features and i-vectors is substantially similar to the curve obtained by DNNs trained on SA features only, which suggests that the i-vector input has the same effect as adding VTLN and FMLLR.

This is also mirrored in the word error rates shown in Table I where the DNN-SI+ivecs and DNN-SA models exhibit very similar recognition performance (10% relative WER improvement over DNN-SI). Additionally, it is observed that DNN-SA with i-vectors results in a 5-6% relative improvement over DNN-SA both before and after sequence training. The additive gains can be explained by observing that the i-vectors for DNN-SA were extracted using a GMM trained on speaker-adapted (SA) features as opposed to using a UBM trained on speaker independent (SI) features for DNN-SI. This allows the i-vectors to encode additional salient speaker information after the VTLN and FMLLR speaker normalization steps.

TABLE 1

| Model | Training | Hub5'00 SWB | RT'03 FSH | RT'03 SWB |
|---|---|---|---|---|
| DNN-SI | x-entropy | 16.1% | 18.9% | 29.0% |
| DNN-SI | sequence | 14.1% | 16.9% | 26.5% |
| DNN-SI + ivecs | x-entropy | 13.9% | 16.7% | 25.8% |
| DNN-SI + ivecs | sequence | 12.4% | 15.0% | 24.0% |
| DNN-SA | x-entropy | 14.1% | 16.6% | 25.2% |
| DNN-SA | sequence | 12.5% | 15.1% | 23.7% |
| DNN-SA + ivecs | x-entropy | 13.2% | 15.5% | 23.7% |
| DNN-SA + ivecs | sequence | 11.9% | 14.1% | 22.3% |

Table 2 illustrates the effect of having different i-vector dimensions for DNNs trained on speaker-adapted features with cross-entropy only, that is, without sequence training. It can be seen that for a sufficiently large dimension (e.g., an i-vector of 100 dimensions) there is a significant drop in WER (e.g., about 0.5% or more). The performance is substantially flat between 100 and 200 dimensions (e.g., less than about 0.2%), which suggests that having an i-vector dimension of 100 is a reasonable choice for this task. It should be understood that additional training data from a larger number of speakers can result in a different operating point.

TABLE 2

| i-vector Dimension | Training | Hub5'00 SWB | RT'03 FSH | RT'03 SWB |
|---|---|---|---|---|
| 40 | x-entropy | 13.7% | 16.0% | 24.6% |
| 100 | x-entropy | 13.2% | 15.5% | 23.7% |
| 200 | x-entropy | 13.4% | 15.6% | 23.6% |

Exemplary methods for performing speaker adaptation for neural network acoustic models have been presented herein. At least one exemplary method provides speaker identity vectors along-side regular ASR features as inputs to the neural net. According to at least one exemplary embodiment, the training and test data are augmented with these i-vectors, which are constant for a given speaker and change across different speakers. I-vector extraction does not require a first pass decoding step yet provides similar gains as VTLN and FMLLR, which do require an additional decoding pass. Moreover, i-vectors extracted from speaker-adapted features are complementary to the feature normalization methods applied and provide additional gains when used in conjunction with speaker-normalized features as input to the neural networks.

By way of recapitulation, according to an exemplary embodiment of the present disclosure, a method 200 (see FIG. 2) for i-vector extraction and determining input features for a DNN includes aligning speaker data with the GMM to estimate the zero-order and first-order statistics. At block 202, quantities are used to estimate the i-vector. At block 203, the estimated i-vector is concatenated to every frame to form the input for neural network training or decoding.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor," "circuit," "module" or "system." Furthermore, embodiments of the present disclosure may take the form of a computer program product embodied in one or more computer readable storage medium(s) having computer readable program code stored thereon.

Furthermore, it should be noted that any of the methods described herein can include an additional step of providing a system for i-vector extraction and determining input features for a DNN (see for example, FIG. 2) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that aligns speaker data with the GMM to estimate the zero-order and first-order statistics (see for example, FIG. 2: 201), a second module that estimates an i-vector (see for example, FIG. 2: 202); and a third module that forms input data for neural network training or decoding (see for example, FIG. 2: 203). Further, a computer program product can include a tangible computer-readable recordable storage medium with code adapted to be executed to carry out one or more method steps described herein, including the i-vector extraction system with the distinct software modules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
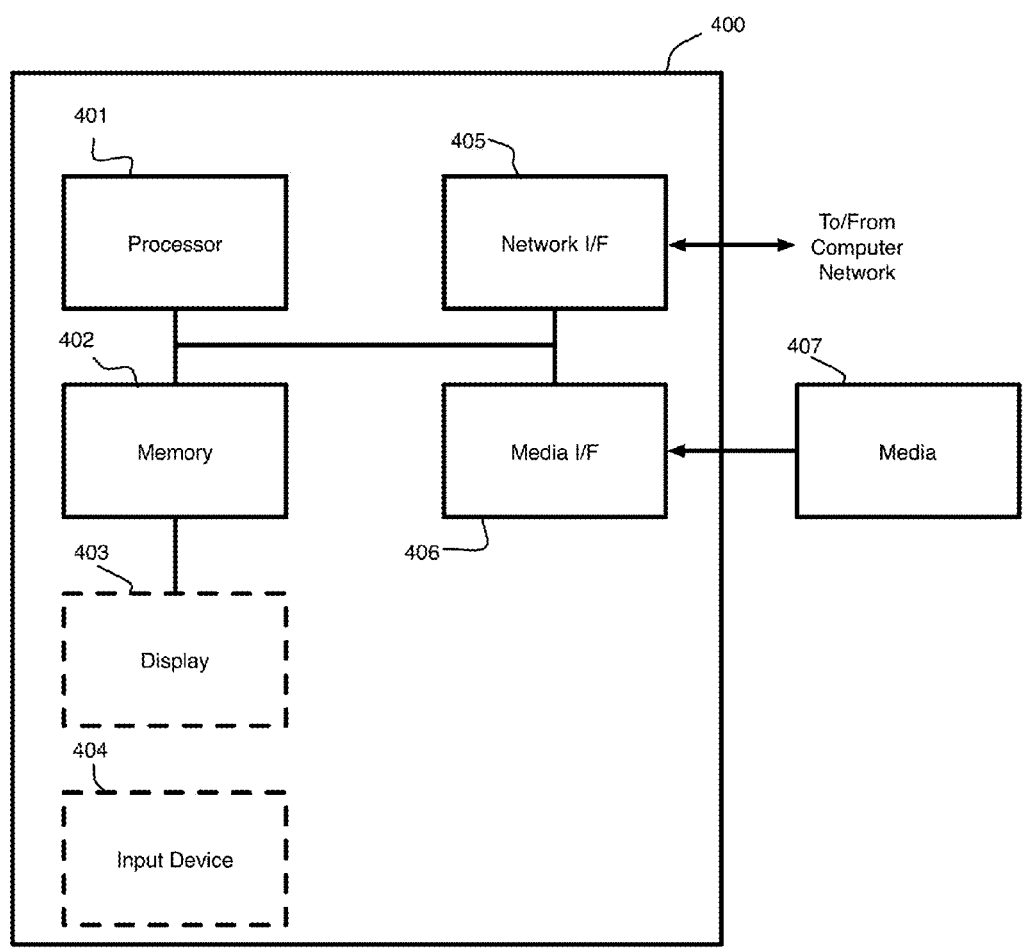
FIG. 4 is a diagram of a system configured to train a neural network using an extracted i-vector according to an exemplary embodiment of the present disclosure.

For example, FIG. 4 is a block diagram depicting an exemplary computer system for i-vector extraction and determining input features for a DNN according to an embodiment of the present disclosure. The computer system shown in FIG. 4 includes a processor 401, memory 402, display 403, input device 404 (e.g., keyboard), a network interface (I/F) 405, a media IF 406, and media 407, such as a signal source, e.g., camera, Hard Drive (HD), external memory device, etc.

In different applications, some of the components shown in FIG. 4 can be omitted. The whole system shown in FIG. 4 is controlled by computer readable instructions, which are generally stored in the media 407. The software can be downloaded from a network (not shown in the figures), stored in the media 407. Alternatively, a software downloaded from a network can be loaded into the memory 402 and executed by the processor 401 so as to complete the function determined by the software.

The processor 401 may be configured to perform one or more methodologies described in the present disclosure, illustrative embodiments of which are shown in the above figures and described herein. Embodiments of the present disclosure can be implemented as a routine that is stored in memory 402 and executed by the processor 401 to process the signal from the media 407. As such, the computer system is a general-purpose computer system that becomes a specific purpose computer system when executing the routine of the present disclosure.

Although the computer system described in FIG. 4 can support methods according to the present disclosure, this system is only one example of a computer system. Those skilled of the art should understand that other computer system designs can be used to implement the present invention.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method comprising:
providing a deep neural network acoustic model;
receiving audio data including one or more utterances of a speaker;
extracting a plurality of speech recognition features from the one or more utterances of the speaker;
creating a speaker identity vector for the speaker based on the speech recognition features extracted from the one or more utterances of the speaker;
performing, by a computer system, an automatic speech recognition using the speech recognition features extracted from the one or more utterances of the speaker and the speaker identity vector by executing the deep neural network acoustic model; and
adapting the deep neural network acoustic model executing on the computer system performing the automatic speech recognition using the speech recognition features extracted from the one or more utterances of the speaker and the speaker identity vector, wherein adapting the deep neural network acoustic model further comprises concatenating the speaker identity vector to each of the speech recognition features extracted from the one or more utterances of the speakers to form an input to the deep neural network acoustic model.

2. The method of claim 1, wherein the speaker identity vector encapsulates information about an identity of the speaker in a low-dimensional fixed-length representation.

3. The method of claim 1, wherein adapting the deep neural network acoustic model further comprises:
training a speaker-independent Gaussian Mixture Model; and
aligning the audio data to the speaker-independent Gaussian Mixture Model to determine zero-order statistics and first-order statistics.

4. The method of claim 1, further comprising clustering a plurality of speakers using respective speaker identity vectors.

5. The method of claim 1, further comprising clustering a plurality of utterances using respective speaker identity vectors.

6. A computer program product for adapting deep neural network acoustic models for automatic speech recognition, the computer program product comprising a computer readable storage medium having program instructions embodied therewith, the program instructions executable by a processor to cause the processor to perform a method comprising:
providing a deep neural network acoustic model;
receiving audio data including one or more utterances of a speaker;
extracting a plurality of speech recognition features from the one or more utterances of the speaker;
creating a speaker identity vector for the speaker based on the speech recognition features extracted from the one or more utterances of the speaker;
performing, by the processor, an automatic speech recognition using the speech recognition features extracted from the one or more utterances of the speaker and the speaker identity vector by executing the deep neural network acoustic model; and
adapting the deep neural network acoustic model executing on a computer system the processor performing the automatic speech recognition using the speech recognition features extracted from the one or more utterances of the speaker and the speaker identity vector, wherein adapting the deep neural network acoustic model further comprises concatenating the speaker identity vector to each of the speech recognition features extracted from the one or more utterances of the speakers to form an input to the deep neural network acoustic model.

7. The computer program product of claim 6, wherein the speaker identity vector encapsulates information about an identity of the speaker in a low-dimensional fixed-length representation.

8. The computer program product of claim 6, wherein adapting the deep neural network acoustic model further comprises:
training a speaker-independent Gaussian Mixture Model; and
aligning the audio data to the speaker-independent Gaussian Mixture Model to determine zero-order statistics and first-order statistics.

9. The computer program product of claim 6, further comprising clustering a plurality of speakers using respective speaker identity vectors.

10. The computer program product of claim 6, further comprising clustering a plurality of utterances using respective speaker identity vectors.

* * * * *